Jan. 18, 1966     P. BELISLE     3,229,395
COMPOSITE ADVERTISING BOARD
Filed Nov. 18, 1963     4 Sheets-Sheet 1

INVENTOR
Pierre BELISLE
BY
ATTORNEYS

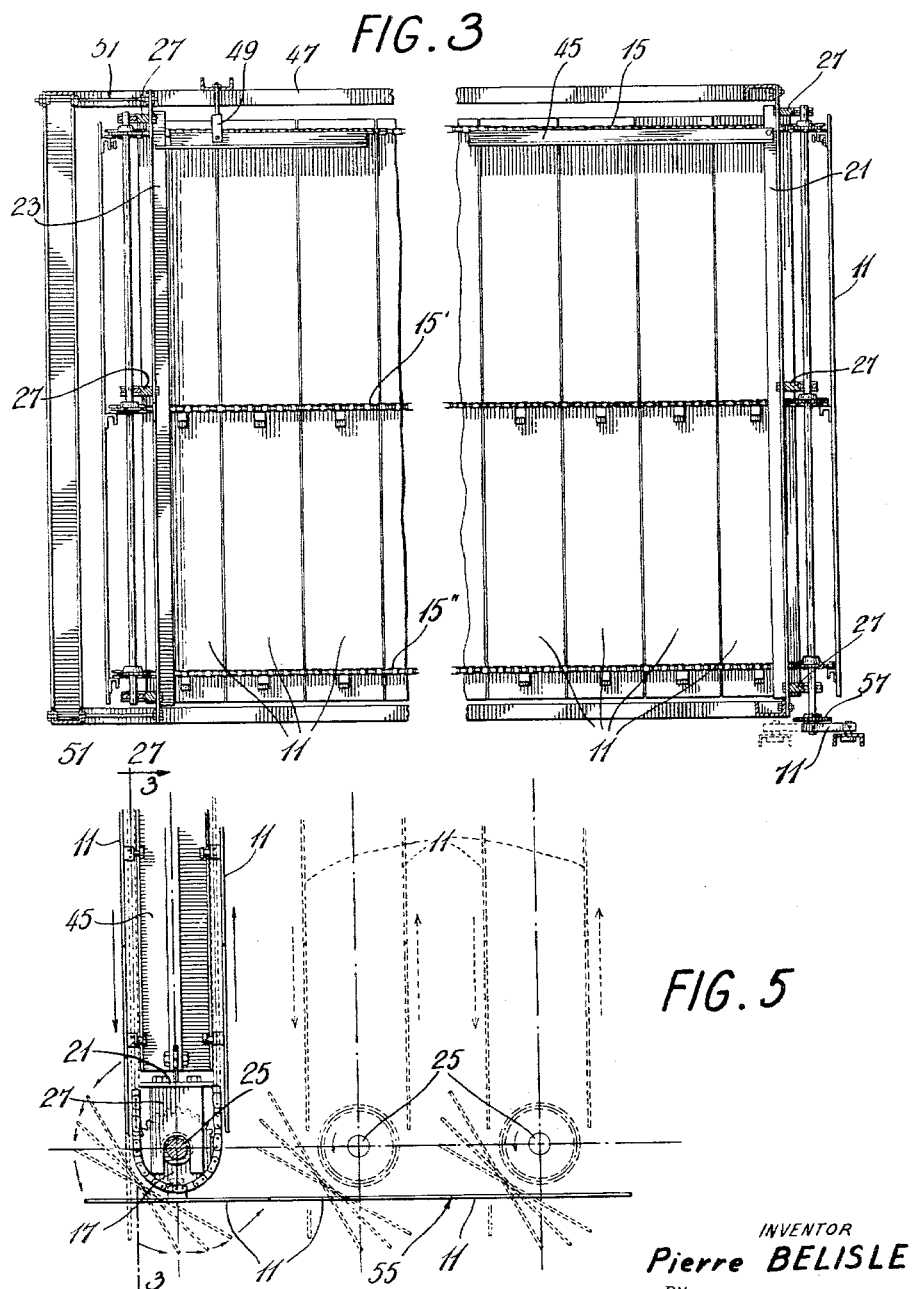

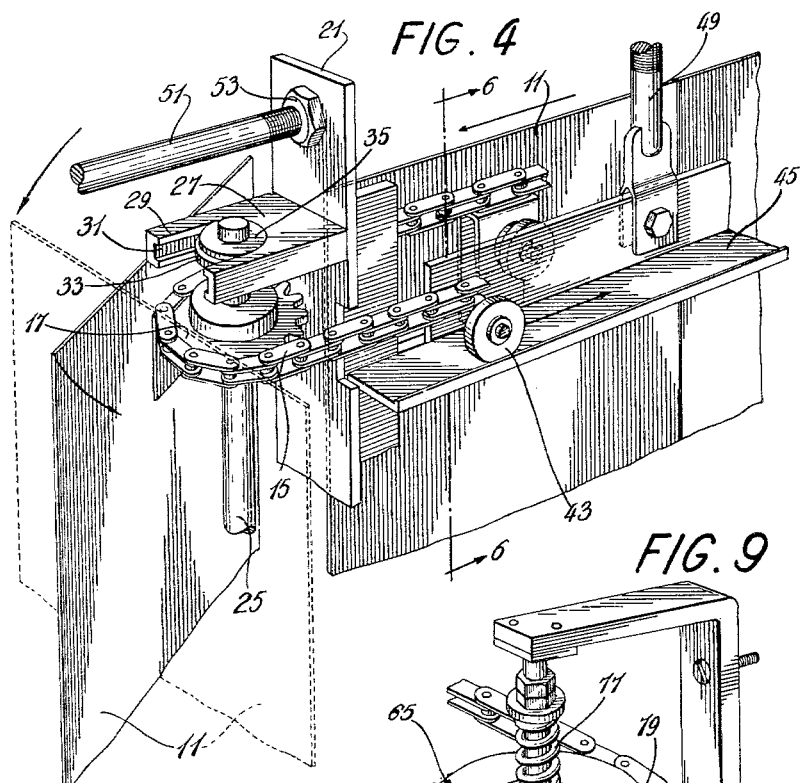
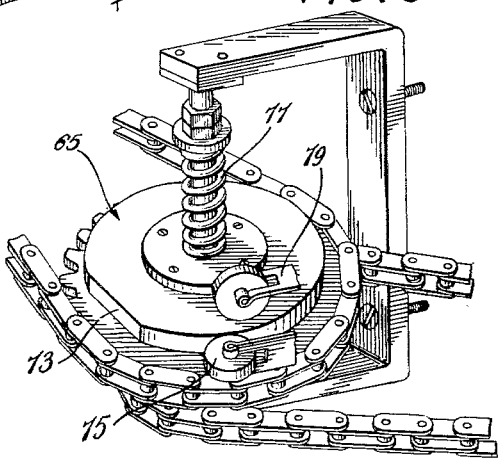
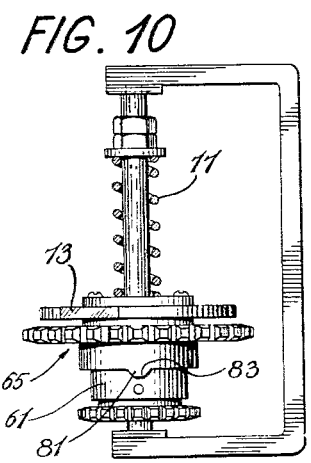

Jan. 18, 1966 P. BELISLE 3,229,395
COMPOSITE ADVERTISING BOARD
Filed Nov. 18, 1963 4 Sheets-Sheet 4
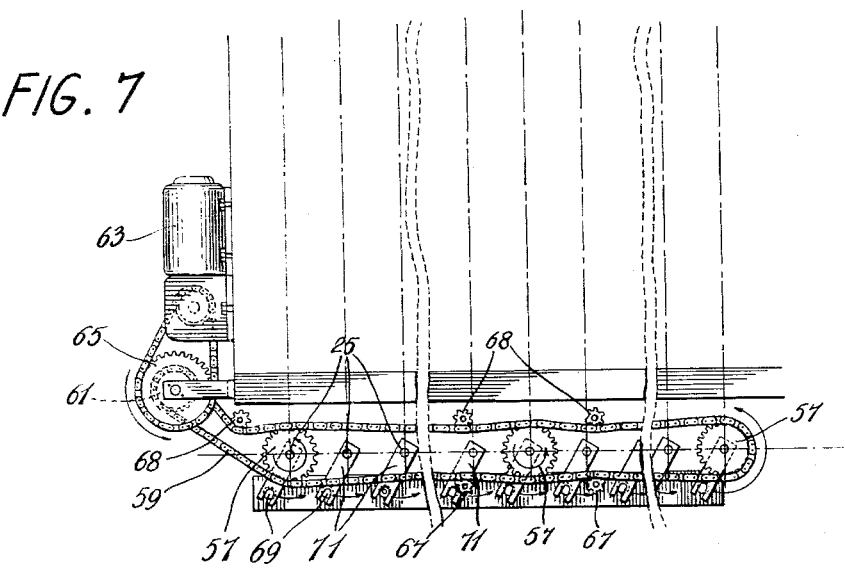
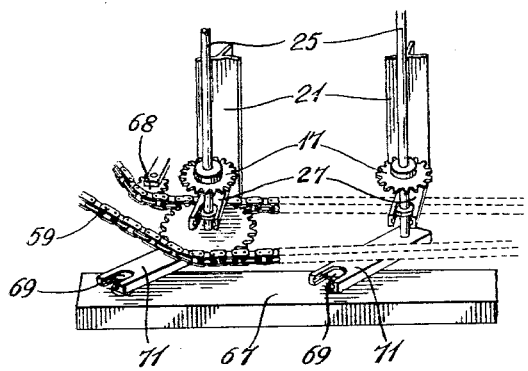
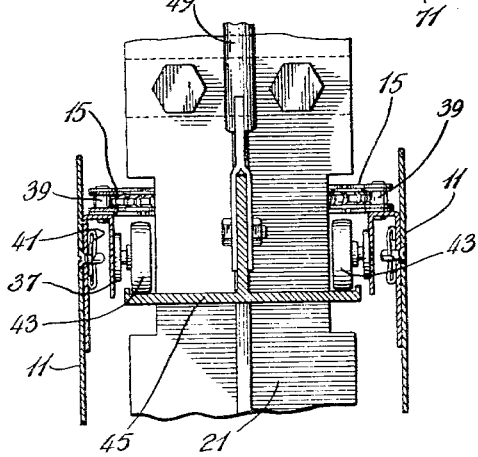
INVENTOR
Pierre BELISLE
BY
ATTORNEYS

United States Patent Office 3,229,395
Patented Jan. 18, 1966

3,229,395
COMPOSITE ADVERTISING BOARD
Pierre Belisle, Montreal, Quebec, Canada, assignor to
Cie. Marile Co., Montreal, Quebec, Canada
Filed Nov. 18, 1963, Ser. No. 324,427
3 Claims. (Cl. 40—76)

The present invention generally relates to advertising boards displayed in public places and more particularly to such a board presenting a succession of publicity images.

Boards of the type contemplated by the invention normally carry only one message so that such displays are relatively expensive, particularly considering that the cost thereof has to be borne by the advertised product only. It follows also, that competition for choice locations is quite keen as only one product may be advertised at one time and that, usually for quite a long period of time in order to properly register in the viewer's mind.

Furthermore, the image being stationary, it often escapes attention as places where great many people gather, and which are the best locations for billboards, are also places where people move hurriedly and are usually not prone to observing still objects or images.

It is therefore a main object of the invention to overcome the above disadvantages by providing an advertising board wherein several advertising images may be successively shown on the same panel for a brief period of time and wherein the change from one image to another is accompanied by movement of the elements making it up, which movement occurring during the change in the color layout of successive images is likely to attract the attention of passers-by. Another important object of the invention is to provide an advertising board having the above features which is simple in structure so that it may be manufactured at relatively low cost and which can be serviced easily, should it get out of order.

These objects may be attained in a composite advertising board such as contemplated by the invention, which board comprises: a frame; a plurality of juxtaposed endless travelling strings of planar panel elements mounted on said frame with an element of one string adapted to cooperate with a corresponding element of each of the other strings to form, when placed side-by-side in the same plane, an advertising panel; means to drive said travelling strings to bring said panel elements successively in said plane, and synchronizing means to allow corresponding elements to move into said plane simultaneously.

A better understanding of the invention will be had by the following description of a preferred embodiment thereof having reference to the appended drawings, wherein:

FIG. 3 is a cross-sectional view in elevation taken generally along line 3—3 of FIG. 5;

FIG. 4 is a partial perspective view intended to illustrate a travelling string of panel elements, some panels being taken away to show the conveying chain;

FIG. 5 is a partial top view of the board of the invention;

FIG. 6 is a cross-sectional view taken along line 6—6 of FIG. 4;

FIG. 7 is a top view of the synchronizing means for the panel elements;

FIG. 8 is a partial perspective view of the driving and synchronizing means for the panel elements;

FIG. 9 is a perspective view of the driving pulley means of the invention;

FIG. 10 is a side elevation view of the device of FIG. 9;

FIG. 11 is a perspective elevation view of the safety joint between the driving and driven pulleys of the driving pulley means.

Figure 1:
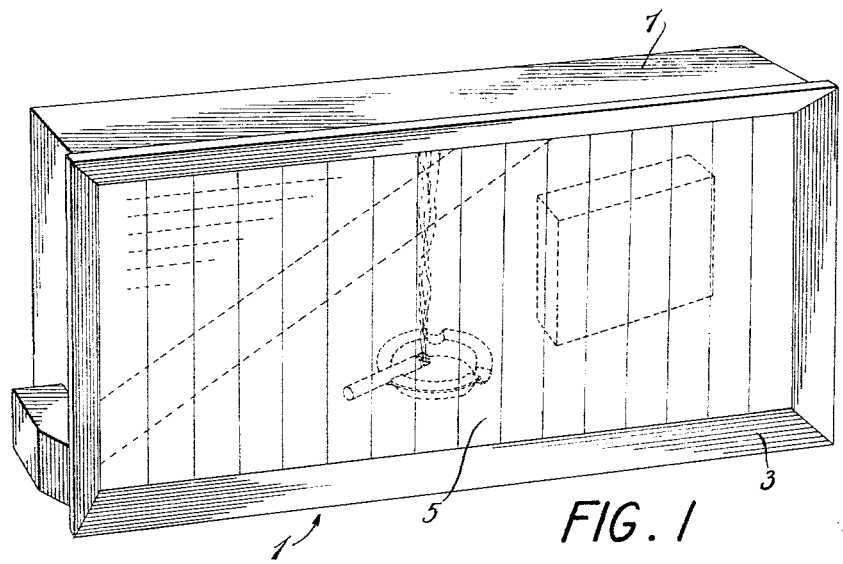
FIG. 1 is a perspective view of a composite advertising board, as contemplated by the invention.
Figure 2:
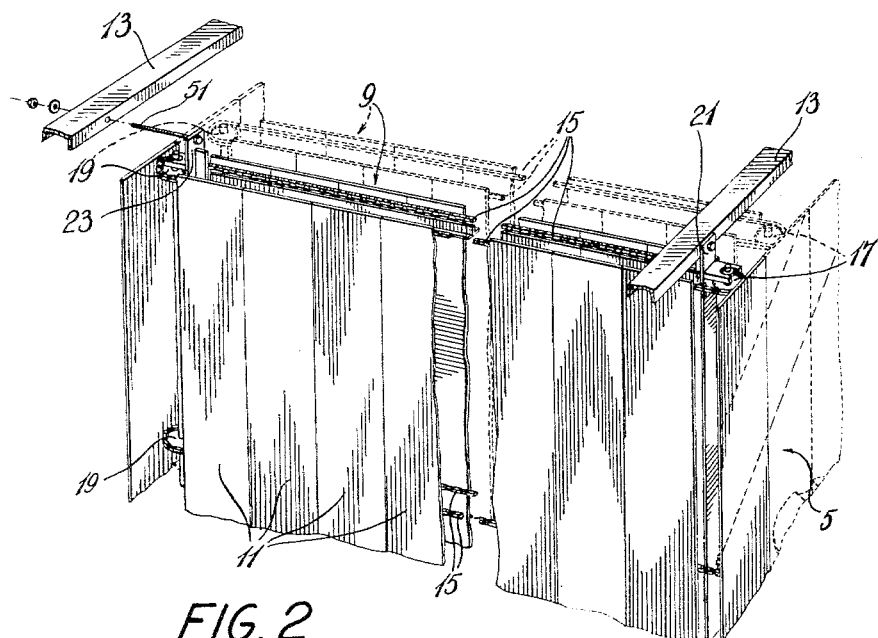
FIG. 2 is also a perspective view showing part of the board, in elevation, with most of the frame structure removed.

FIGS. 1 and 2 generally illustrate the principle of the invention which is seen to consist of a board 1 made up of a frame 3 within which is mounted the panel 5 adapted to carry the publicity message. Behind frame 3 and mounted thereon is the mechanism housing 7.

From FIG. 2 it will be seen that the invention comprises a plurality of juxtaposed endless travelling strings 9 of planar panel elements 11 mounted on frame 3 here represented by a pair of channel-shaped struts 13; the front of the board where panel 5 lies being on the rightward end. It will be understood that means are provided to drive the travelling strings 9 into rotation and that an element of one string is adapted to cooperate with a corresponding element of each of the other strings to form, when placed side-by-side in the same plane, as shown in FIGS. 1 and 2, an advertising panel. For this purpose it is also necessary to provide synchronizing means to ensure that corresponding elements which form an advertising panel move into the said plane simultaneously.

Each string 9 is formed of an endless conveyor, preferably a sprocket chain 15 adapted to wind around training pulleys such as the front sprocket wheel 17 and the rear sprocket wheel 19. Elements 11 are secured to sprocket chain 15, in a manner to be more fully described later, and also to other endless chains 15', 15'' (FIG. 3) in order to provide a smooth movement without elements 11 swaying away from the carrying chains.

There is thus provided a plurality of groups of vertical, front and rear aligned posts 21 and 23 respectively.

All sprocket wheels 17, 19 are parts of assemblies mounted on posts 21, 23 in a similar manner which is clearly illustrated, particularly in FIGS. 4 and 5. It will only therefore be necessary to describe one installation as all other installations are alike.

Each sprocket wheel is mounted on a shaft 25, the ends of which, as well as the center part, journal into bearings 27 formed as a saddle 29 formed with an inner groove 31 adapted to receive the bearing shoulder 33 of a ring 35 fastened to shaft 25. The same structure is provided for the wheels of sprocket chains 15' and 15'' at the center and the lower part of the board.

The panel elements are hung from the upper chain 15 in the manner indicated in FIG. 6. For this purpose, U-shaped brackets 37, at least one for each panel element 11, are fastened to chain 15 preferably through the connecting pins 39 joining successive links of the chain. On one leg of each bracket is secured, as by any conventional means such as clip 41, the panel element and on the other side, a roller 43 adapted to ride on a guiding track 45 which is generally T-shaped in cross-section, the bars of the T serving as races for rollers 43.

As best seen in FIGS. 3 and 4, the guiding track 45 is an elongated member which stretches between the front and rear of the board and is secured to rear post 21 at the front end while fastened to a horizontal transverse member 47 in the upper part of the frame, at the rear end thereof by means of support 49. It should be noted that, at this end, the guiding track is free from front post 23, the latter being fastened, at the top and bottom (see FIG. 3), directly to the forward part of frame 1 by means of threaded tie rods 51. Thus, by adjustment of nuts 53 (FIG. 4) it becomes possible to move post 21 in relation to post 23 thus tightening or loosening chains 15, 15' and 15".

With the aforedescribed structure and with reference to FIG. 5, operation of the device will now be easily understood.

When shafts 25 are brought into rotation (in a manner to be described later) the various chains 15, 15' and 15" are brought to travel around wheels 17 and 19 to successively bring the advertising panel elements 11 forwardly in a plane 55 (FIG. 5) which is normal to the direction of movement of the chains. With proper synchronizing means, it will become possible to bring all elements belonging to a particular advertising image in plane 55 simultaneously. Of course, the spacing between the various chains of panel elements must be such that there is no interference between elements of adjacent chains during rotation thereof around wheels 17, 19.

The driving means for strings 9 is as follows.

A driven sprocket wheel 57 is provided at the lower end of some of shafts 25 which are engaged by a single driving sprocket chain 59 receiving its power from a driving wheel 61 driven into rotation by a motor 63 through a speed reducing arrangement including a sprocket wheel 65. Pinions 68, suitably disposed and mounted, are provided for taking up the slack in the driving chain 59. In conjunction with the synchronizing means to be described below, all chains 15, 15', 15" are driven simultaneously and at the same speed.

The synchronizing means which ensures that the panels belonging to a single publicity image move into the aforesaid plane 55 of the panel simultaneously is composed of a synchronizing bar 67 provided, on one face, with upwardly projecting pins 69 evenly distributed and at a distance equal to the distance between the axis of adjacent shafts 25. To each shaft 25 is fastened a synchronizing lever 71, one end of which is shaped as a fork which encircles a corresponding pin 69. The operation of the synchronizing means is as follows:

Motor 63 simultaneously brings driving wheels 61, 65, driven wheels 57, and finally synchronizing levers 71, and consequently shafts 25 not provided with wheels 57, in simultaneous rotation. All levers 71 being interconnected through the synchronizing bar 67, this would ensure that all shafts 25 will move through the same angular distance under the action of the driving motor 63 so that it can be arranged to have the panel elements belonging to the same advertising image brought in the frontal plane 55 simultaneously.

It is also necessary that, once an image has been formed, the panel elements in plane 55 remain in that position for a brief period of time. For that purpose, it is suggested to provide the second driving wheel 65 with a flattened portion 73 (FIG. 9) which, in cooperation with the operating arm 75 of a timing device, will cut off the motor for a certain period of time, after which, the operation of the motor is resumed. For that purpose, the circumference of first driving wheel 61 must be 4 times smaller than that of wheels 57.

Similarly, the first and second driving wheels 61 and 65 may be coupled with some sort of a friction clutch which, under the resistive force created as when one of the chains 15 blocks, will cause the second driving wheel 65 to disengage and rise from the first driving wheel 61 against the action of a spring 77 and in this action operating a safety lever 79 adapted to cut off the power to the motor. As suggested in FIGS. 10 and 11, the coupling arrangement may be formed of a cooperating ridge 81 in the second driving wheel 65 receivable in a corresponding groove 83 on the surface of the first driving wheel 61.

I claim:

1. In a composite advertising board having a plurality of juxtaposed endless travelling strings of planar elements with an element of one string adapted to cooperate with a corresponding element of each of the other strings to form when placed side-by-side in the same plane an advertising panel, said travelling strings being brought into movement by the rotation of parallel shafts, the improvement residing in synchronizing means for said shafts comprising:

(a) a synchronizing bar;
   (b) a synchronizing lever, for each shaft, secured at one end thereof to the corresponding shaft to project radially therefrom, and
   (c) means to pivotally mount the other ends of said levers on said synchronizing bar at evenly spaced locations therealong whereby said levers take on the same angular orientation.

2. In a composite advertising board having a plurality of juxtaposed endless travelling strings of planar elements with an element of one string adapted to cooperate with a corresponding element of each of the other strings to form when placed side-by-side in the same plane an advertising panel, said travelling strings being brought into movement by the rotation of parallel shafts, the improvement residing in synchronizing means for said shafts comprising:

(a) a synchronizing elongated bar having a plurality of pins, equal in number to that of the shafts, projecting from an elongated surface thereof and evenly spaced along said surface;
   (b) a synchronizing lever, for each shaft, secured at one end thereof to the corresponding shaft to project radially therefrom; said levers being formed at the free ends thereof, as forks for the insertion of the corresponding pins to act as pivot joints therebetween, and
   (c) means to bring at least one of said shafts into rotation to cause the remaining shaft to rotate in synchronism through said synchronizing bar and levers.

3. In a composite advertising board having a plurality of juxtaposed endless travelling strings of planar elements with an element of one string adapted to cooperate with a corresponding element of each of the other strings to form when placed side-by-side in the same plane an advertising panel, said travelling strings being brought into movement by the rotation of parallel shafts, the improvement residing in mounting and synchronizing means for said shafts comprising:

(a) a post for each shaft mounted parallel therewith;
   (b) bearing means for each end of said shafts comprising:
      a bearing plate fixed to said post to extend normal thereto in the direction of the corresponding shaft end; said plate defining a U-shaped saddle at the free end thereof formed with a longitudinal groove opening at the open end of said saddle, and
      a ring secured on the corresponding shaft end and inserted in said groove to pivot therein during rotation of the shaft;
   (c) a synchronizing elongated bar having a plurality of pins, equal in number to that of the shafts, projecting from an elongated surface thereof and evenly spaced along said surface;
   (d) a synchronizing lever, for each shaft, secured at one end thereof to the corresponding shaft to project radially therefrom; said levers being formed at the free ends thereof, as forks for the insertion of the corresponding pins to act as pivot joints therebetween; and (e) means to bring at least one of said shafts into rotation to cause the remaining shaft to rotate in synchronism through said synchronizing bar and levers.

References Cited by the Examiner
UNITED STATES PATENTS

| | | | |
|---|---|---|---|
| 785,736 | 3/1905 | Jacobs | 40—32 |
| 2,231,590 | 2/1941 | Pflueger | 40—32 |
| 2,238,177 | 4/1941 | Marks et al. | 40—32 |
| 2,923,079 | 2/1960 | Bouchard | 40—32 |

FOREIGN PATENTS

| | | |
|---|---|---|
| 22,900 | 6/1930 | Australia. |
| 304,862 | 1/1929 | Great Britain. |
| 534,861 | 3/1941 | Great Britain. |

EUGENE R. CAPOZIO, *Primary Examiner.*

JEROME SCHNALL, *Examiner.*

JOHN W. WILL, *Assistant Examiner.*